(Model.)
G. ZUBER.
Filter.
No. 242,407.  Patented May 31, 1881.
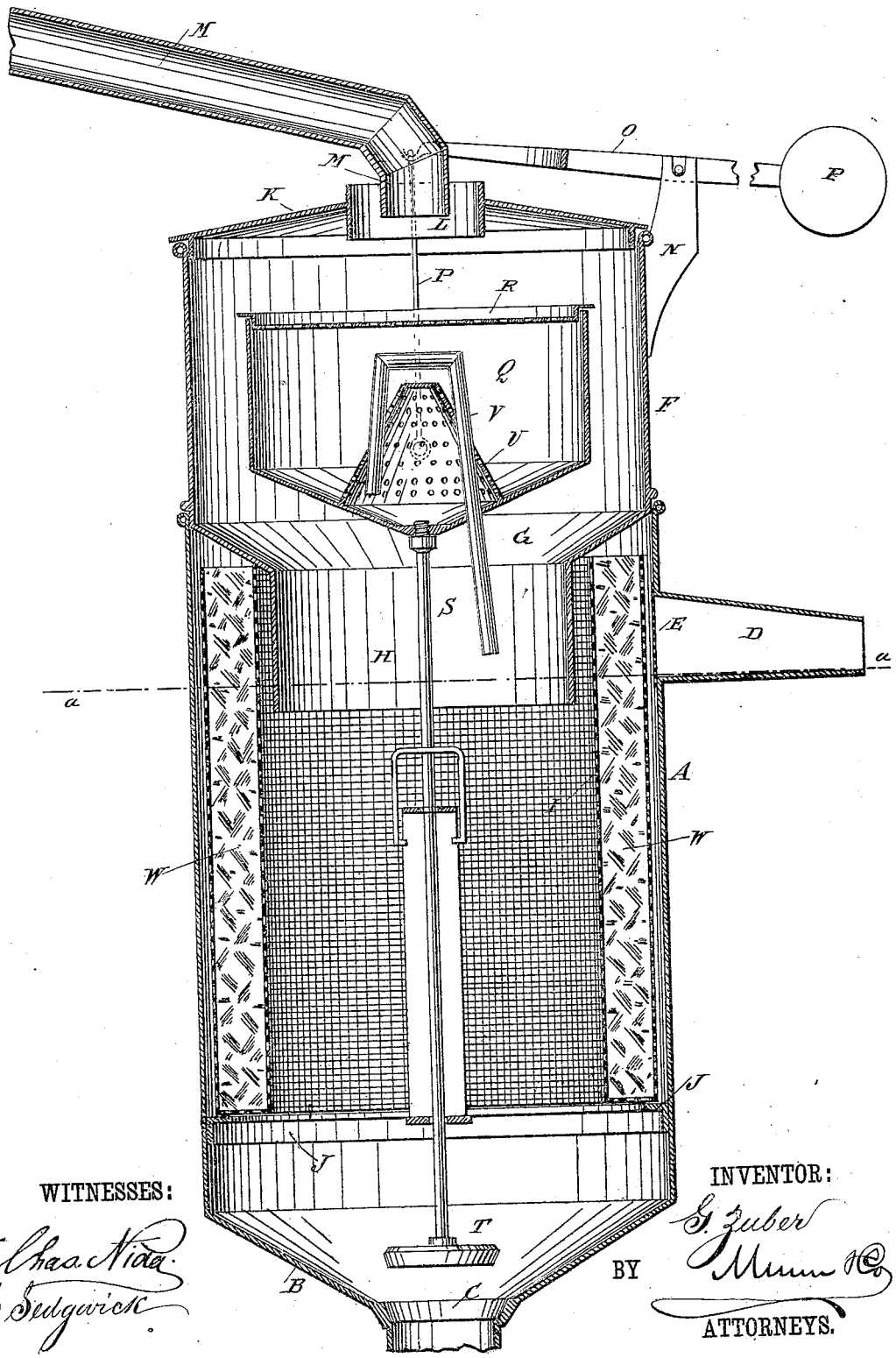
WITNESSES:
INVENTOR:
G. Zuber
BY
Munn & Co.
ATTORNEYS.

UNITED STATES PATENT OFFICE.

GOTTLIEB ZUBER, OF NEW ORLEANS, LOUISIANA.

FILTER.

SPECIFICATION forming part of Letters Patent No. 242,407, dated May 31, 1881.

Application filed April 4, 1881. (Model.)

*To all whom it may concern:*

Be it known that I, GOTTLIEB ZUBER, of New Orleans, in the parish of Orleans and State of Louisiana, have invented a new and Improved Filter, of which the following is a full, clear, and exact description.

The object of my invention is to provide a new and improved filter which purifies the water passing through the same and removes the sediment automatically.

The invention consists in a cylindrical vessel containing a tubular sieve filled with charcoal, which cylindrical vessel is provided with a spout at about half its height and with a port in the funnel-shaped bottom, which port is closed by a valve attached to a rod carrying a cup-shaped vessel and is attached to one end of a balanced lever, whereby, when the water enters the filter, the cup-shaped vessel is filled and descends, the valve closing the aperture in the bottom of the vessel, so that the water rises in the cylinder, passes through the sieve and charcoal, is purified, and passes off through the spout. When the supply of water is cut off the water is removed from the cup-shaped vessel by a siphon, and the weight of the lever raises the vessel and the valve, so that the sediments can be washed off through the bottom part by the water running from the filter.

In the accompanying drawing a cross-sectional elevation of my improved filter is shown.

The cylindrical vessel A is provided with a funnel-shaped bottom, B, having a central aperture, C, and with a spout, D, near its upper end, which spout is provided with a transverse wire netting, E, or a finely-perforated plate at its inner end. A cylindrical vessel, F, with a beveled shoulder, G, rests upon the top of the vessel A, and the lower narrower part, H, of this upper vessel, F, passes down below the bottom of the spout D and into a tubular sieve, I, filled with charcoal, W, or broken pumice-stone, &c., contained within the vessel A and resting upon an annular flange, J, at the bottom of the vessel A, this tubular sieve I extending upward above the top of the spout. The upper vessel, F, is provided with a cover, K, with a central aperture, L, into which the end of the water-supply pipe M passes. An arm, N, is attached to the side of the upper vessel, F, and on this arm N a lever, O, is pivoted, on the outer end of which lever a weight, P, is mounted, whereas two rods, P, passing down into the vessel F and supporting a cup-shaped or cylindrical vessel, Q, with a beveled bottom, and having a perforated lid, R, are suspended from the inner forked end of this lever O. A rod, S, is attached to the bottom of the cup-shaped vessel Q, extends down to near the bottom of the vessel A, and is provided at its lower end with a valve, F, fitting into the aperture C of the bottom B. A conical sieve, U, rests on the bottom of the cup-shaped vessel Q, and from the interior of this conical sieve U a bent siphon-tube, V, extends upward and then down through the bottom of the cup-shaped vessel Q, into the narrow part H of the vessel F, a short distance below the bottom of the spout D.

The operation is as follows: The water passes from the supply-pipe into the vessel F and fills the cup-shaped vessel Q, causing the same to descend, whereby the valve T closes the port C. The water flows over the top of the cup-shaped vessel Q and fills the vessel A up to about the line $a$, and flows off through the spout D. The heavier particles of the impurities drop to the bottom of the vessel A, and the lighter particles float on the surface of the water within the narrow part H of the vessel F. As this part H of the vessel F extends down below the level of the water the impurities that float on the water cannot pass into the charcoal W or clog the sieves I and E. The water that leaves the vessel A must all pass through the charcoal W and the sieves I and E, whereby it is purified. From the spout D it is conducted to a cistern or directly into a pail or other vessel. As soon as the supply of water is shut off the water in the cup-shaped vessel Q is drawn off by the siphon-tube V, thus permitting the weight P to raise the vessel Q, whereby the valve T is raised, and the water in the vessel A, below the spout, flows off through the port C, washing off all the impurities that have collected at the bottom of the vessel A, and at the same time the impurities that have floated on the surface of the water in the narrow part H of the vessel F are carried off. The filter is thus cleaned automatically every time the supply of water is shut off, and the above operation is repeated every time that water enters into the filter through the pipe M.

The filter can be made of any desired size, and can be attached to the leaders conducting water from a roof to a cistern or to a hydrant or spout, as may be desired.

The lid R of the cup-shaped vessel Q can be removed for the purpose of cleaning it. Likewise the upper vessel, F, and the tubular sieve G.

Having thus described my invention, what I claim as new, and desire to secure by Letters Patent, is—

1. A filter made substantially as herein shown and described, and consisting of a cylindrical vessel containing a tubular sieve filled with charcoal, which cylindrical vessel is provided with a port in the bottom closed by a valve attached to the end of rod carrying a cup-shaped vessel, and attached to the end of a balanced lever pivoted to an arm of the cylindrical vessel, as set forth.

2. In a filter, the combination, with a cylindrical vessel provided with a port, C, in the bottom of the cup-shaped vessel Q, suspended from the end of a balanced lever, O, of the rod S and the valve T, substantially as herein shown and described, and for the purpose set forth.

3. In a filter, the combination, with the cylindrical vessel A, provided with a spout, D, with a wire netting, E, near its upper end, of the cylindrical vessel F, resting on the vessel A, and provided with a shoulder, G, and a narrower lower part, H, extending below the bottom of the spout D, substantially as herein shown and described, and for the purpose set forth.

4. In a filter, the combination, with the cylindrical vessel A, provided with a spout, D, near its upper end, of a tubular sieve, I, containing a filtering substance, W, of a cylindrical vessel, F, with a shoulder, G, and a narrower lower part, H, extending into the top of the tubular sieve I, and below the bottom of the spout D, substantially as herein shown and described, and for the purpose set forth.

5. In a filter, the combination, with the cylindrical vessel A, provided with a spout, D, and with a port, C, in the bottom, of the tubular sieve I, filled with a filtering substance, W, of the cylindrical vessel F, provided with a shoulder, G, and a narrower lower part, H, of the cup-shaped vessel Q, suspended from one end of a balanced lever, O, of the rod S, and the valve T, attached to the lower end of the same.

6. In a filter, the combination, with the cylindrical vessel A, provided with a spout, D, and a port, C, in the bottom, of the tubular sieve I, cylindrical vessel F, the cup-shaped vessel Q, suspended from balanced lever O, the rod S, the valve T, the conical sieve U in the cup-shaped vessel Q, and of the siphon-tube V, substantially as herein shown and described, and for the purpose set forth.

7. In a filter, the combination, with the cylindrical vessel A, provided with a spout, D, and a port, C, in the bottom, of the tubular sieve I, the cylindrical vessel F, the cup-shaped vessel Q, suspended from a balanced lever O, the perforated lid R, the conical sieve U, the siphon-tube V, the rod S, and the valve T, substantially as herein shown and described, and for the purpose set forth.

GOTTLIEB ZUBER.

Witnesses:
LOUIS HUGUENEL,
EMILE WAGNER.